United States Patent [19]

Acampora et al.

[11] 4,315,262
[45] Feb. 9, 1982

[54] SATELLITE COMMUNICATION SYSTEM WITH A PLURALITY OF LIMITED SCAN SPOT BEAMS

[75] Inventors: Anthony Acampora, Freehold; Douglas O. Reudink, Sea Girt, both of N.J.

[73] Assignee: Bell Telephone Laboratories, Incorporated, Murray Hill, N.J.

[21] Appl. No.: 33,735

[22] Filed: Apr. 26, 1979

[51] Int. Cl.³ ............................................. H04B 7/00
[52] U.S. Cl. ........................ 343/100 ST; 343/100 SA
[58] Field of Search .................... 343/100 SA, 100 ST

[56] References Cited

U.S. PATENT DOCUMENTS

| | | | |
|---|---|---|---|
| 3,711,855 | 1/1973 | Schmidt et al. | 343/100 SA |
| 3,750,175 | 7/1973 | Lockerd et al. | 343/100 SA |
| 3,928,804 | 12/1975 | Schmidt et al. | 343/100 ST X |
| 4,090,199 | 5/1978 | Archer | 343/100 SA |
| 4,188,578 | 2/1980 | Reudink et al. | 343/100 ST X |

OTHER PUBLICATIONS

K. G. Schroeder; *Characteristics and Applications of Multibeam Spacecraft Antennas;* Progress in Astronautics & Aeronautics; 24-26 Apr. 72, vol. 3, pp. 503-531.
W. G. Schmidt et al.; *A Satellite Switched SDMA/TDMA System for a Wideband Multibeam Sattelite;* International Conf. on Comm.; 11-13 Jun. 73; vol. 1, pp. 12-7 to 12-12.
D. O. Reudink et al.; *A Scanning Spot Beam Sattelite System;* Oct. 77; Bell System Tech. Jour., vol. 56, No. 8, pp. 1549-1560.
A. Acampora et al.; *Efficient Utilization of Sattelite Transponders Via Time Division Multibeam Scanning;* Oct. 78, Bell Sys. Tech. Jour., vol. 57, No. 8, pp. 2901-2914.

*Primary Examiner*—T. H. Tubbesing
*Attorney, Agent, or Firm*—Erwin W. Pfeifle

[57] ABSTRACT

The present invention relates to a satellite communication system comprising a plurality of limited scan spot beams which permits high transponder utilization efficiency by virtue of pooling the resources of each terrestrial footprint. In an embodiment of the invention, a satellite comprises a plurality of transponders, the signals from each transponder being directed via one or more associated scanning beams over a separate limited scanning beam region on the surface of a celestial body. In a preferred arrangement, each of the plurality of scanning spot beams is scanned linearly and parallel to the other scanning spot beams in a manner wherein each of the scanning beams covers a separate one of adjacent bands dividing the overall service region on the celestial body. By proper orientation of each of the scan regions or bands, nearly equal volumes of traffic can be served by each transponder.

6 Claims, 11 Drawing Figures

SATELLITE COMMUNICATION SYSTEM WITH A PLURALITY OF LIMITED SCAN SPOT BEAMS

BACKGROUND OF THE INVENTION

1. Field of the Invention

The present invention relates to a satellite communication system comprising a plurality of x limited scan spot beam ports and, more particularly, to a satellite communication system comprising a plurality of x limited scan spot beam ports and a plurality of N transponders, where $x \geq N$ and each spot beam port is scanned over a separate limited portion of the overall region to be serviced by the satellite and each transponder is associated with one or more ports and can only be coupled to one port at a time so that each transponder handles a substantially equal amount of traffic.

2. Description of the Prior Art

The early satellite communication system designs employed an area coverage beam which provided interconnections on either a time-division multiple access (TDMA) basis or a frequency-division multiple access (FDMA) basis. Such designs had the disadvantage of low antenna gain, and frequency reuse was only possible by the use of polarization techniques. More recent designs use (a) multiple narrow-angle fixed spot beams with on-board satellite switching to provide frequency reuse, high capacity, and high antenna gain, (b) a single scanning beam to provide high antenna gain, (c) the combination of an area coverage beam and multiple narrow-angle fixed spot beams to provide high capacity, and (d) the combination of multiple narrow-angle fixed spot beams and a single scanning beam with on-board satellite switching.

A typical prior art design is shown in U.S. Pat. No. 3,711,855, issued to W. G. Schmidt et al on Jan. 16, 1973, which illustrates a conventional multiple-transponder satellite with n transponders for n or more ground stations where each transponder covers a particular portion of the frequency spectrum and no two ground stations may concurrently transmit in the same frequency band. Another design is shown in U.S. Pat. No. 3,928,804, issued to W. G. Schmidt et al on Dec. 23, 1975, where a plurality of receive spotbeam antennas are selectively connected to a plurality of transmit spotbeam antennas by an on-board switching matrix. Additionally, several other separate receive and transmit spotbeam antennas are connected to a common receiver and transmitter, respectively, by a respective on-board input and output switch.

In the more recently proposed Intelsat V satellite communication system, it has been proposed to concurrently use an overlapping fixed spot beam, a larger area zone coverage beam, and a still larger hemisphere coverage beam, each type of beam using a different frequency spectrum and/or polarization for transmitting its signals to avoid interference at receivers capable of receiving signals in more than one type of beam, for increasing satellite throughput capacity. Additionally, the concurrent use of both a plurality of fixed spot beams and an area coverage beam, which overlaps the spot beams and where all beams use the same frequency spectrum for transmission, has been proposed in the article "Spectral Reuse in 12 GHz Satellite Communication Systems" by D. O. Reudink et al in IEEE Conference Record ICC 77, June 12-15, 1977, Chicago, Ill., Vol. 3 at pp. 37.5-32 to 37.5-35. There, arrangements are disclosed for substantially cancelling the interference of the received signals originally transmitted in the area coverage beam with the desired spot beam signals received in each of the overlapped spot beam receiver areas.

Arrangements for using a movable beam in satellite, airborne, or mobile communication systems have also been disclosed. For example, U.S. Pat. No. 3,750,175 issued to R. M. Lockerd et al on July 31, 1973 discloses a modular electronics communication system comprising a plurality of radiating elements formed into an antenna array for transmitting and receiving communication frequency signals and employing a central processor to generate the transmitted signals and process the received frequencies through a manifold arrangement. Each radiating element connects to the manifold through a module made up of integrated microwave circuitry including a mixer coupled to a local oscillator and a phase shifter coupled to a beam steering computer. By means of the beam steering computer the antenna can be made to scan various preselected areas to primarily overcome tolerances in the satellite's or aircraft's attitude control system and maintain a beam at a desired target area. Additionally, the possible use of steerable beams and time-hopped steerable beams was suggested, but no implementation thereof shown, in *Progress in Astronautics and Aeronautics*, Vol. 33, pp. 503-531 at page 507 in the article "Characteristics and Applications of Multibeam Spacecraft Antennas", which was presented as Paper 72-530 at the AIAA 4th Communications Satellite Systems Conference, Washington, D.C., Apr. 24-26, 1972.

In the article "A Scanning Spot Beam Satellite System" by D. O. Reudink et al in *The Bell System Technical Journal*, Vol. 56, No. 8, October 1977 at pp. 1549-1560 a satellite communication system was disclosed which involves the use of a steerable spot beam which can be rapidly scanned across the entire service region via a phased array antenna, thereby providing universal coverage. When used in conjunction with a multitude of fixed spot beams, the resulting hybrid system has the advantage of frequency reuse, high antenna gain, and identical transponders. However, such a hybrid system does not utilize the transponders efficiently because of nonuniform traffic demands from the various ground areas covered.

In an Article "Efficient Utilization of Satellite Transponders Via Time-Division Multibeam Scanning" by A. Acampora et al in *The Bell System Technical Journal*, Vol. 57, No. 8, October 1978, a space segment of a satellite system is disclosed wherein a fixed number of identical transponders are shared among a larger number of spot beam regions which completely span a large total service area. In the arrangement, time-division multiple access techniques are employed and each transponder is rapidly scanned over appropriately defined group pairs of spot beam regions, thereby establishing full coverage and full interconnectivity. In the Acampora et al arrangement, the resources of the transponders can be allocated as needed on a time division basis among a far larger number of spot beam footprints which completely cover the entire service region. For such a system, the capacity required by each footprint must be smaller than the capacity of a single transponder since two or more transponders cannot simultaneously serve the same footprint on a noninterfering basis. Naturally, the total capacity required from all regions must be less than the total capacity of all transponders. A powerful result proven in the Acampora et al article is that a TDMA traffic assignment can always be found provided that the global properties of the traffic matrix satisfy only these broad requirements, i.e., the existence of an assignment does not depend upon the details of beam-to-beam traffic entities. For realistic traffic matrices, the assignment can usually be made to avoid interference caused by the antenna sidelobes of neighboring beams.

A practical problem associated with this approach is the need to provide rapid interconnection between any satellite transponder and any service region. This can be done either with an N×M high power crossbar switch to connect any of the N transponders to any of the M footprints, or with a phased array antenna capable of simultaneously forming N independent beams, directed anywhere within the service region. This latter approach always requires a large number of phase shifters which can be equal to the number of transponders multiplied by the number of antenna elements. In addition, the N independent signals must be combined prior to each element, either in power or in voltage. Voltage addition is simpler, but the combined signal must then be power amplified with a resultant intermodulation power loss.

The problem remaining in the prior art is to provide a satellite communication system which is capable of high transponder utilization efficiency and overcomes the shortcomings indicated with the above-described systems while providing simplified on-board electronics.

SUMMARY OF THE INVENTION

The problems associated with the prior art satellite communication systems have been overcome in accordance with the present invention which relates to a satellite communication system comprising a plurality of limited scan spot beam ports and, more particularly, to a satellite communication system comprising a plurality of x limited scan spot beam ports and a plurality of N transponders, where x>N and each spot beam port is scanned over a separate limited portion of the overall region to be serviced by the satellite and each transponder is associated with one or more ports and can only be coupled to one port at a time so that each transponder handles a substantially equal amount of traffic.

It is an aspect of the present invention to provide a multiple limited scan spot beam satellite communication system which can achieve highly efficient utilization of the available satellite transponders by virtue of pooling the resources of each transponder over a separate zonal area much larger than that of a single spot beam footprint. By dividing the total service region into a number of parallel strip zones which totally span the overall service region and servicing the strips via alternating polarizations, the entire spectral band can be reused in each strip on a noninterfering basis.

In accordance with the present satellite communication system, an on-board satellite switching subsystem is provided comprising a first antenna means, a second antenna means and a switching means. The first antenna means comprises a plurality of feed elements forming x receiving antenna ports, each antenna port being associated with a separate one of x up-link beams and only n of x beams are concurrently received at any instant of time and n≦x, wherein during a predetermined time period sequential bursts of information are capable of being received at each antenna port from a separate portion of a plurality of m remote, spaced-apart, ground areas in a predetermined time-division multiple access (TDMA) sequence which bursts of information are destined for the same or other ones of the m ground areas, where m>x and different traffic demands can exist between each of the pairs of m ground areas. The second antenna means comprises a plurality of feed elements forming x transmitting antenna ports with each transmitting antenna port being capable of forming a separate down-link spot beam which is associated with a separate portion of the plurality of m ground areas, the second antenna means being capable of transmitting the bursts of information received at the n of x ports of the first antenna means toward the destined ground areas in the n of x down-link beams. The switching means is disposed between the first and second antenna means and is capable of selectively transferring the concurrently received bursts of information between the associated antenna ports of the first and second antenna means in accordance with the predetermined TDMA sequence for appropriate transmission in the plurality of n of x concurrently transmitted down-link spot beams to the destined ground areas. In accordance with the present invention, each of the x antenna ports of the first and second antenna means is capable of causing the associated beam to be scanned over the ground areas of the associated separate portion of plurality of m ground areas in accordance with each pairing sequence as dictated by the predetermined TDMA sequence in a manner whereby all transponders on the satellite will handle an approximately equal amount of traffic.

Other and further aspects of the present invention will become apparent during the course of the following description and by reference to the accompanying drawings.

BRIEF DESCRIPTION OF THE DRAWING

Referring now to the drawings, in which like numerals represent like parts in the several views.

DETAILED DESCRIPTION

Figure 1:
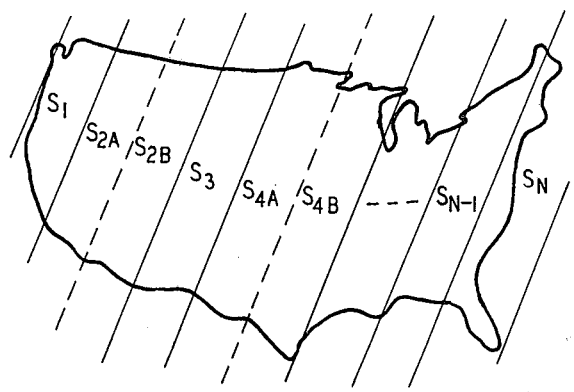
FIG. 1 illustrates an exemplary linear nonoverlapping subdivision of the total service region of the United States into N equal linear traffic zones $S_1$ to $S_N$ for the transmission of signals between the total service region and the satellite in accordance with the present invention.

In accordance with the present invention, a technique employing limited scan spot beams is hereinafter described which is capable of high transponder utilization efficiency by virtue of pooling the resources of a given transponder over a region much larger than that of a single footprint on the surface of a celestial body. These resources can then be dynamically allocated as needed. Thus, no capacity need be wasted upon a fixed spot beam region exhibiting a smaller demand than the capacity of a single transponder, and the scanning spot beam region described in the hereinbefore cited article by D. O. Reudink et al in BSTJ, Vol. 56, No. 8 of Oct. 19, 1977 can be served by more than one transponder is needed.

Dynamic allocation of the resources at the satellite can be effected in, for example, the manner described in the hereinbefore cited article by A. Acampora et al in BSTJ, Vol. 57, No. 8, October, 1978. To illustrate such technique, it will be assumed that the total region over which service is to be provided is completely covered or spanned by a large number M of spotbeam footprints. For example, if it is desired to cover the 3 degrees×6 degrees area of the continental United States as seen from geostationary orbit, approximately M=100 footprints would be needed, each with 3 dB beamwidths of 0.5 degrees. Let the traffic between each of these M spotbeam footprints be denoted by the matrix $$T = \begin{bmatrix} t_{1,1} & t_{1,2} & \cdots & t_{1,M} \\ t_{2,1} & t_{2,2} & \cdots & t_{2,M} \\ \vdots & & & \\ t_{M,1} & t_{M,2} & \cdots & t_{M,M} \end{bmatrix} \quad (1)$$

where element $t_{i,j}$ represents the traffic originating in footprint #i, destined for footprint #j. There are N<<M identical satellite transponders available, each of capacity of, for example, C voice circuits. Let $$A_i = \sum_{j=1}^{M} t_{i,j}, \; 1 \leq i \leq M \quad (2)$$

$$B_j = \sum_{i=1}^{M} t_{i,j}, \; 1 \leq j \leq M \quad (3)$$

It is to be noted that $A_i$ represents the total traffic originating within footprint #i, and $B_j$ represents the total traffic destined for footprint #j.

Suppose $B_i \leq C$, $A_j \leq C$, for all i's all j's, and $$\sum_{i=1}^{M} A_i = \sum_{j=1}^{M} B_j = \sum_{i=1}^{M} \sum_{j=1}^{M} t_{i,j} = NC.$$

Then, from the dynamic allocation technique of the hereinbefore mentioned BSTJ article, a traffic assignment can be found which utilizes each transponder with 100 percent efficiency.

An alternative noninterfering assignment can often be made in the following manner. For such alternative assignment it will be assumed that it is possible to divide the total service area into N transmit zones and N receive zones with the following characteristics:

(1) the N transmit zones are mutually non-interfering, that is, no two or more up-link transmissions occurring from different zones can interfere with a level higher than −20 dB at the satellite;

(2) the N receive zones are mutually non-interfering, that is, no two or more down-link transmissions destined for different zones can interfere with a level higher than −20 dB; and (3) the traffic originating from and destined for each zone is equal to C.

Figure 2:
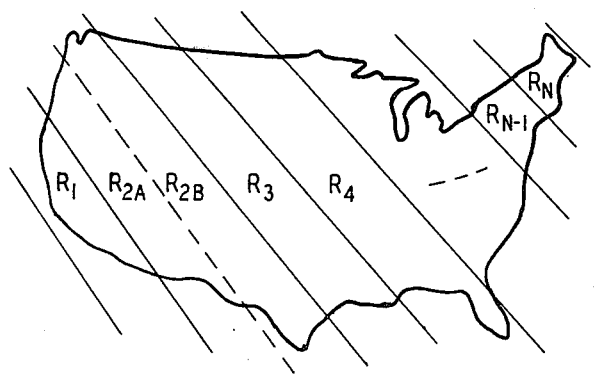
FIG. 2 illustrates an exemplary linear nonoverlapping subdivision of the total service region of the United States into N equal linear traffic zones $R_1$ to $R_N$ for the reception of signals at the total service region which were switched through the satellite in accordance with the present invention.
Figure 3:
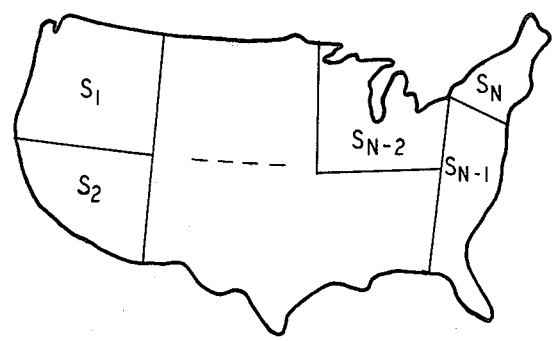
FIG. 3 illustrates an exemplary sectional nonoverlapping subdivision of the total service region of the United States into N equal non-linear traffic zones $S_1$ to $S_N$ for the transmission of signals between the total service region and the satellite in accordance with the present invention.

A possible subdivision is as shown in FIGS. 1 and 2, drawn for transmit and receive linear zonal boundaries, respectively. The $i^{th}$ transmit zone is denoted by $S_i$ in FIG. 1, and the $j^{th}$ receive zone is denoted by $R_j$ in FIG. 2. It is to be understood that the transmit and receive zones, as is shown in FIGS. 1 and 2, respectively, need not be geographically the same within the overall service region of the satellite, nor must all zones include an identical number of footprints. It is further to be understood that although it is preferable that the transmit and receive zones have linear zonal boundaries, the present invention should not be so limited, since the present invention of limited scan spot beams will also be operable with N sectional zonal boundaries are shown, for example, in FIG. 3 for the N transmit zones. A similar sectional zonal arrangement can also be derived for the N receive zones.

From the original traffic matrix T and from the zonal breakdown of FIGS. 1 and 2, a new N×N traffic matrix $\tau$ can be defined whose elements $\tau_{i,j}$ represent the total traffic originating from transmit zone $S_i$ in FIG. 1 destined for receive zone $R_j$:

$$\tau = \begin{bmatrix} \tau_{1,1} & \tau_{1,2} & \cdots & \tau_{1,N} \\ \tau_{2,1} & \tau_{2,2} & \cdots & \tau_{2,N} \\ \vdots & & & \\ \tau_{N,1} & \tau_{N,2} & \cdots & \tau_{N,N} \end{bmatrix} \quad (4)$$

For this matrix, the technique described in the hereinbefore mentioned BSTJ article for dynamic allocations can be used to assign the traffic to the N transponders in a noninterfering manner. From matrix (4), one unit of traffic is extracted from each row and column such that no row or column has more than one unit of capacity removed. This is always possible. These N traffic units are assigned to the same TDMA time slot and are distributed over the N satellite transponders. Having completed this step, the remaining traffic has the property that each row and column now contains C-1 units of traffic, and each transponder is left with C-1 units of capacity. These steps are repeated until all traffic has been assigned and all transponders are fully loaded.

Figure 4:
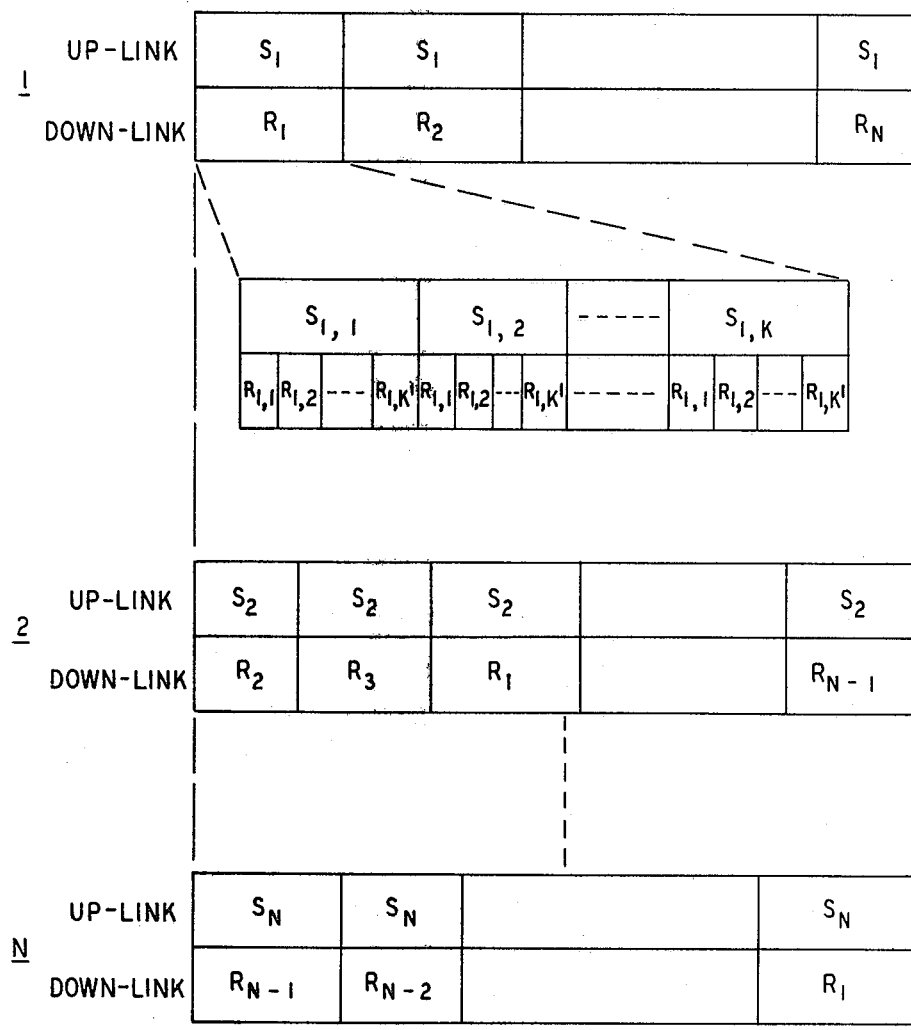
FIG. 4 illustrates an exemplary non-conflicting traffic assignment of a typical TDMA switching frame sequence for N transponders for interconnecting N transmit and receive zones and each of the footprints or separate ground areas therein.

A possible transponder assignment is illustrated by the N transponder TDMA frames of FIG. 4. It should be noted that the up-link of transponder N is always connected to the $N^{th}$ transmit zone $S_N$, and that at any point in time, no two transponders are connected to the same receive zone $R_N$. Similarly, the assignment could have been made such that the down-link of transponder N is always connected to the $N^{th}$ receive zone $R_N$, and no two transponders are simultaneously connected to the same transmit zone.

Consider now transponder No. 1. In FIG. 4, the time period for which zone $S_1$ is connected to zone $R_1$ has been expanded. The $K_1$ footprints which span zone $S_1$ are denoted by $S_{1,1}, S_{1,2}, \ldots, S_{1,K_1}$, and the $K_1$ footprints which span zone $R_1$ are denoted by $R_1, R_{1,2}, \ldots R_{1,K'_1}$. The capacity allocated to communication between zones $S_1$ and $R_1$ is exactly equal to the total traffic originating from the $K_1$ footprints of zone $S_1$ and destined for the $K_1$ footprints of zone $R_1$. Thus, while zone $S_1$ is connected to zone $R_1$, the up-link of transponder No. 1 is directed to receive the signals from footprint $S_{1,1}$ and the down-link is swept in time sequence over all $K'_1$ footprints of zone $R_1$. Having completed this, the up-link limited scanning beam is moved to receive the signals from footprint $S_{1,2}$ and again the down-link limited scanning beam is swept over all the $K'_1$ footprints of zone $R_1$. The sequence continues in this manner, as shown, until each of the $K_1$ footprints of zone $S_1$ have had an opportunity to communicate with each of the $K'_1$ footprints of zone $R_1$. The time allotted to transponder No. 1 for communication between zones $S_1$ and $R_1$ is precisely equal to the time needed to interconnect the footprints of each region as based upon the footprint-to-footprint demand for service of matrix (1).

This process is repeated for all other zonal interconnections. Thus, an assignment technique has been presented which satisfies the traffic requirements of the original traffic matrix T on a noninterfering basis and with 100 percent transponder utilization efficiency.

Figure 5:
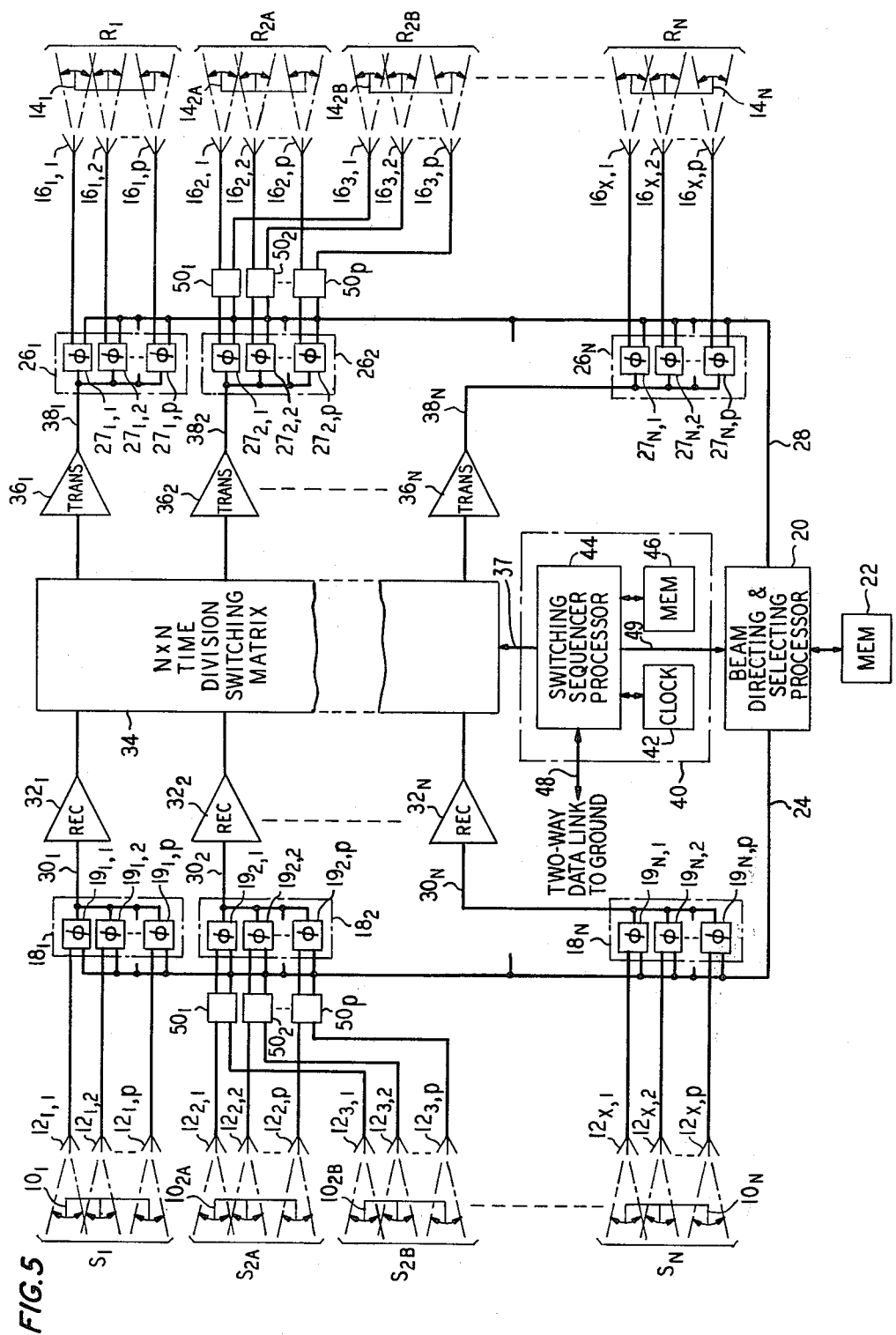
FIG. 5 is a block diagram of a satellite repeater in accordance with the present invention for effecting a multiple limited scan spot beam satellite communication system.

FIG. 5 illustrates a satellite switching repeater for concurrently transmitting and receiving a plurality of n limited scan spot beams via x antenna ports where x≧n. The repeater can selectively receive n concurrent up-link beams designated $10_1-10_N$ at n of x associated antenna sections $12_1-12_x$, respectively, from the respective transmit zones $S_1$ to $S_N$ as shown, for example, in FIGS. 1 and 3. Each of antenna sections $12_1$ to $12_x$, for purposes of discussion hereinafter only, will be considered to be a separate phased antenna array section comprising p feed elements. Therefore, in FIG. 5, the feed elements of antenna sections $12_1$ to $12_x$ will have the designation $12_{i,j}$ where i designates the antenna section 1-x, and j designates the feed element 1-p of each antenna section.

In conjunction with the concurrent reception of up-link beams $10_1$ to $10_N$, n down-link limited scan spot beams $14_1-14_N$ are selectively transmitted by n of x antenna sections $16_1-16_x$, respectively, to the destined respective receive zone $R_1$ to $R_N$ as shown, for example, in FIG. 2. Each of the antenna sections $16_1-16_x$, for purposes of discussion hereinafter only, will be considered to be a separate phased antenna array section comprising p feed elements. Therefore, in FIG. 5, the feed elements of antenna sections $16_1$ to $16_x$ will have the designation $16_{i,j}$ where i designates the antenna section 1 to x, and j designates the feed elements 1-p of each antenna section. It is to be understood, however, that antenna sections $12_1-12_x$ and $16_1-16_x$ can comprise any suitable antenna means capable of receiving and transmitting each of the limited scan up-link beams $10_1-10_N$ and down-link spot beams $14_1-14_N$, respectively. For example, the antenna means can comprise a single reflector having the requisite aperture to cover all of the associated limited scan spot beam geographical ground areas shown in FIGS. 1-3 and a separate feedhorn or cluster of feedhorns for each footprint of each limited scan spot beam $10_1-10_N$ and $14_1-14_N$ disposed on the focal plane of the reflector at a point where the associated footprint of each limited scan spot beam is focused by the reflector. An example of such antenna arrangement is disclosed in U.S. patent application Ser. No. 943,064 filed for E. A. Ohm on Sept. 18, 1978 which comprises a feed array including plural feedhorns which are selectively energized in cluster groups to produce contiguous beams with adjacent cluster groups sharing feedhorns and providing beams which illuminate separate adjacent ground areas or footprints. A phased array antenna means for providing plural independent limited linear scanning spot beams is disclosed in a copending patent application Ser. No. 33,734 filed on the same day as the present application for C. Dragone and assigned to the same assignee. Additionally, a similar antenna arrangement for providing limited linear scanning beams will be described hereinafter in conjunction with FIG. 6.

The receiving antenna sections $12_1-12_x$ are coupled singularly or in two or more sections, as will be described hereinafter for FIG. 10 to a separate beam directing means $18_1-18_N$, which beam directing means are controlled by a beam directing and selecting processor 20 to direct the associated antenna section 12 toward each of the footprints of the associated limited scan transmit zone S in accordance with a predetermined frame sequence as shown, for example, in FIG. 4. Where each phased array antenna section 12 comprises p feed elements, each of beam directing means $18_1-18_N$ would comprise p phase shifters $19_1-19_p$ which are respectively associated with corresponding ones of the feed elements of the one or more antenna sections associated with each beam directing means 18. For example, in FIG. 1, zone $S_1$ is shown as comprising one portion or stripe $S_1$ of the overall service region while zone $S_2$ comprises two portions or stripes $S_{2A}$ and $S_{2B}$. In FIG. 5, only one antenna section $12_1$ would be required to service zone $S_1$ while two antenna sections $12_2$ and $12_3$ would be needed to service zone $S_2$ sections $S_{2A}$ and $S_{2B}$, respectively. Where two or more antenna sections are needed to communicate with a zone as shown for zone $S_2$, then corresponding feed elements $12_{2,1}, 12_{3,1}$, to $12_{2,p}, 12_{3,p}$ of the two associated antenna sections $12_2$ and $12_3$ are each coupled through a separate beam selecting means $50_1$ to $50_p$, respectively, to respective ones of the phase shifters $19_{2,1}$ to $19_{2,p}$ of beam directing means $18_2$. Phase shifters 19 and beam directing means 50 can comprise any suitable circuit well known in the art and an exemplary beam selecting means will be described hereinafter in association with FIG. 10. Beam directing and selecting processor 20 can comprise any suitable processor which generates N concurrent sequences of control signals by, for example, sequencing through memory locations in a memory 22 as is well known in the art, which N sequences of control signals are then concurrently transmitted over a bus 24 to beam directing means $18_1$–$18_N$ and beam selecting means $50_1$–$50_p$ to appropriately receive the signals from each of the N transmission zones $S_1$–$S_N$ in accordance with the predetermined frame format shown, for example, in FIG. 4.

In a similar manner, antenna sections $16_1$–$16_x$ are coupled to beam directing means $26_1$–$26_N$, respectively, each of which comprising p phase shifters $27_1$–$27_p$, and beam selecting means $50_1$–$50_p$ where required which are controlled by beam directing and selecting processor 20 to direct limited scan spot beams $14_1$–$14_N$ toward each of the footprints of the associated limited scan receive zones R in accordance with a predetermined frame sequence as shown, for example, in FIG. 4. The beam directing and selecting processor 20 generates N concurrent sequences of control signals which are transmitted over bus 28 to the beam directing means $26_1$–$26_N$ and beam selecting means $50_1$–$50_p$. For example, as shown in FIG. 4, when considering the subframe when transponder 1 is coupled to the up-link signals from transmit zone $S_1$ and the down-link beam is directed towards the footprints of receive zone $R_1$. During this subframe period beam directing and selecting processor 20 generates a sequence of control signals on bus 24 to beam directing means $18_1$ to cause antenna elements $12_{1,1}$–$12_{1,p}$ to be oriented to receive a maximum signal in sequence from footprints $S_{1,1}, S_{1,2}, \ldots, S_{1,K}$ during each appropriate subframe time interval. Concurrent therewith, beam directing and selecting processor 20 generates another sequence of control signals over bus 28 to beam directing means $26_1$ to cause antenna elements $16_{1,1}$–$16_{1,p}$ to scan beam $14_1$ sequentially over footprints $R_{1,1}$–$R_{1,K}$, while beam $10_1$ is momentarily associated with each of the transmit zone $S_1$ footprints. Concurrent therewith, beam directing and selecting processor 20 also transmits control signals on buses 24 and 28 to cause limited scan beams $10_2$–$10_N$ and $14_2$–$14_N$ to be similarly directed at the appropriate footprints of the indicated transmit and receive zones.

The signals received at antenna sections $12_1$–$12_x$ are directed over leads $30_1$–$30_N$, respectively, to the respective receive sections $32_1$–$32_N$ of transponders 1–N. The output signals from receive sections $32_1$–$32_N$ form N separate inputs to an N×N time division switching matrix 34 which appropriately switches the signals from receive sections $32_1$–$32_N$ to the appropriate transmit sections $36_1$–$36_N$ of transponders 1–N respectively, in accordance with a predetermined frame format as shown, for example, in FIG. 4. Time division switching matrix 34 can comprise any suitable switching matrix which can provide high-speed switching with relatively low power requirements. Exemplary switches which have the desired characteristics are, for example, the well known microwave switches which include, inter alia, the semiconductor diode (PIN) switch and the magnetic latching switch. The output signals from transmit sections $36_1$–$36_N$ are sent via leads $38_1$–$38_N$ and beam directing means $26_1$–$26_N$, respectively for launching in respective beams $14_1$–$14_N$ to the appropriate receive zones $R_1$–$R_N$ and the footprints therein.

In the arrangement of FIG. 5, the output signals from receive sections 32 are concurrently and selectively switched by the space and time division switching matrix 34, in response to control signals on bus 37 from a clock and switching sequencer 40, to the appropriate transmit sections $36_1$–$36_N$. Clock and switching sequencer 40 comprises a clock circuit 42, a switching sequencer processor 44 and a memory section 46. The clock circuit 42 is synchronized with all the system clocks at the remote ground areas or footprints by any suitable technique as, for example, via telemetry signals on a twoway data link 48 from one or more ground stations to permit effective reception and transmission of signals through the satellite repeater via switching matrix 34. The clock pulses from circuit 40 are also transmitted over lead 49 for use by beam directing processor 20 for coordinating the control signals transmitted over buses 24 and 28 to beam directing means $18_1$–$18_N$ and $26_1$–$26_N$, respectively, to direct limited scan spot beams $10_1$–$10_N$ and $14_1$–$14_N$ at the appropriate ground areas in synchronization with (a) the expected arrival and transmission of signals related to each ground area and (b) the simultaneous switching of the received signals to the appropriate down-link beams by switching matrix 34. Synchronization of the system clocks can be achieved using any suitable technique known in the art which, for example, can take the form of synchronization pulses which are transmitted via round trip telemetry signals through the satellite repeater to the various ground stations. The switching sequencer processor 44 of circuit 40 generates the necessary control signals to interconnect the appropriate input and output leads through the switches of matrix 34 during each frame interval in response to the synchronized clock signals from clock 42 and the desired interconnection sequence stored in the associated memory section 46. Any suitable high-speed switching sequencer and memory means which is available can be used to generate the desired control signals.

It is to be understood that beam directing means $18_1$–$18_N$ and $26_1$–$26_N$ can comprise any suitable circuit such as, for example, phase shifters mentioned hereinbefore which are well known in the art where antenna elements 12 and 16 form parts of phased array antenna sections, or a switching circuit for directing the signals to or from the appropriate feedhorn or cluster of feedhorns where an antenna similar to that described in the hereinbefore mentioned patent application Ser. No. 943,064 filed for E. A. Ohm is used.

Figure 6:
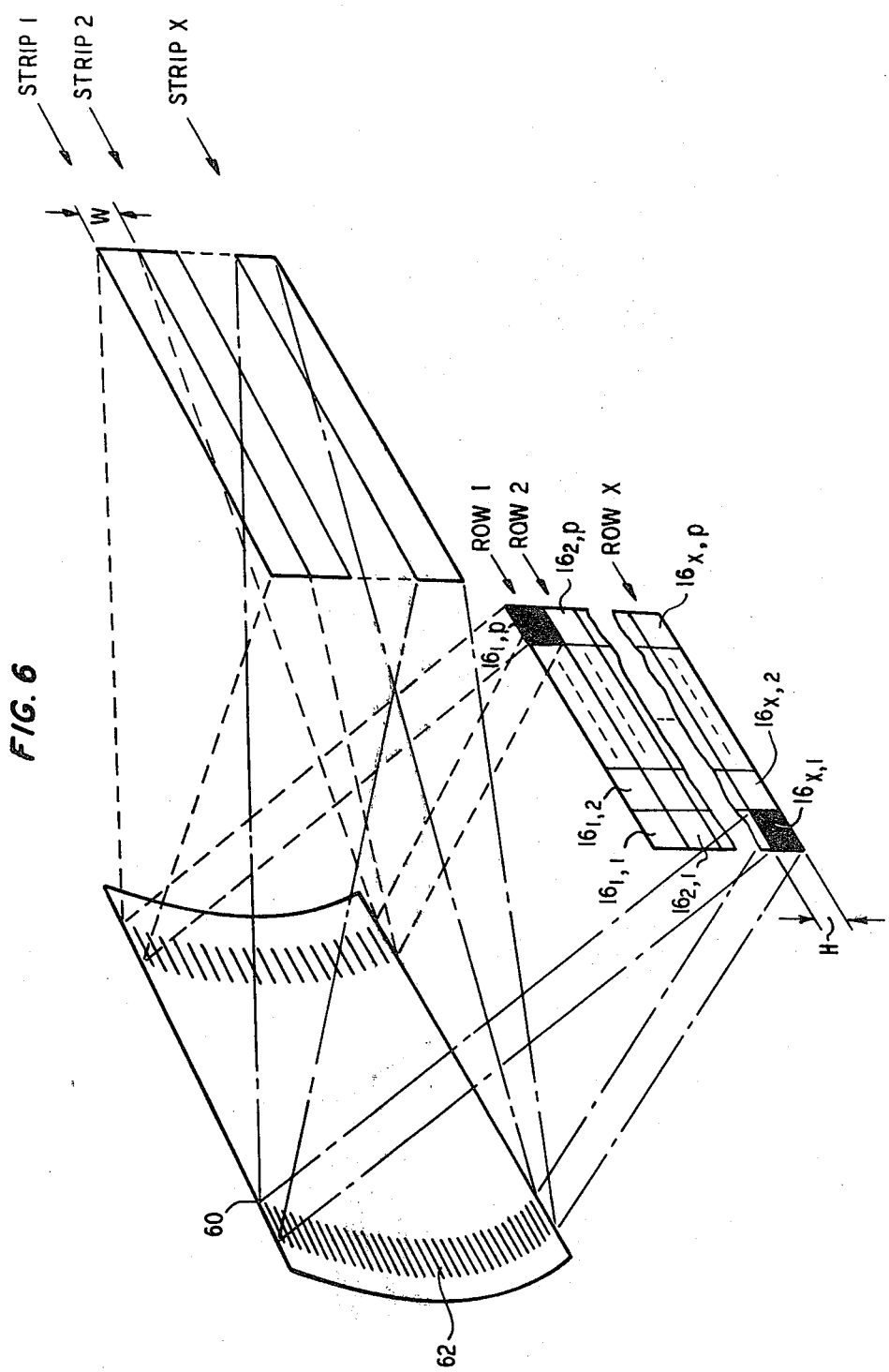
FIG. 6 is a diagram of an exemplary array antenna for limited scanning over multiple independent linear strip subdivisions of the total service area.

FIG. 6 illustrates an exemplary phased array antenna configuration for providing multiple limited linear scanning spot beams with each beam being capable of scanning over an independent limited strip zone to effect the transponder load balancing technique according to the present invention. The discussion hereinafter will be limited to the array of feedhorns $16_{1,1}$–$16_{1,p}$ to $16_{x,1}$–$16_{x,p}$ for generating limited linear scanning down-link spot beams $14_1$–$14_N$, respectively, and it is to be understood that a corresponding technique is applicable to the array of feed elements $12_{1,1}$–$12_{1,p}$ to $12_{x,1}$–$12_{x,p}$ for receiving up-link beams $10_1$–$10_N$, respectively.

The antenna arrangement of FIG. 6 is shown as consisting of a set of linear array of feedhorns $16_{1,1}$–$16_{1,p}$ to $16_{x,1}$–$16_{x,p}$ located in the focal plane of a cylindrical parabolic reflector 60 oriented parallel to the linear array feeds. Each feed element $16_{i,j}$ in the array is dimensioned, as is known to those skilled in the art, to radiate electromagnetic energy which is spherical substantially in one plane. Each row of feed elements 16 of the array acts essentially as a line source radiating a wavefront which is transformed by the reflector 60 into a spot beam in the far field. Each feed element 16 in the array illuminates a particular strip of the cylindrical parabolic reflector 60, as shown, which in turn illuminates a strip X in the far field, also shown, with a phase progression which is slightly different across the strip X for each element 16 of a row. The height H of each feed element 16 in the array controls the corresponding width W of the image. Adjacent strips of the reflector 60 surface illuminated by adjacent array elements from a common row in the array feed illuminate the same far field strip X but with different phase. For example, feed elements $16_{1,1}$, $16_{2,1}$ and $16_{x,1}$ all being in the same column of the feed array each illuminate the same strip 62 on reflector 60 but are reflected to illuminate far field strips 1-X, respectively. Feed elements $16_{1,1}$ to $16_{1,p}$ all being in the same row of the feed array illuminate different strips on the reflector 60 but are reflected to illuminate the same far field strip 1. Similarly the feed elements 16 of rows 2-X of the array illuminate strips 2-X, respectively, in the far field of reflector 60.

The superposition of all such images forms a spot beam within the far field. Thus, by linearly varying the phase across the elements 16 of one row, a spot beam can be formed anywhere within the far field strip X associated with that row. Feed elements 16 form an adjacent row in the array field illuminate the same strips upon the reflector surface but with a constant phase offset relative to the neighboring rows. This corresponds to a linear translation of the strip formed in the far field. By properly phasing the feed elements of X rows in the array feed, X independent spot beams are formed, one in each of X strips of the far field.

Figure 7:
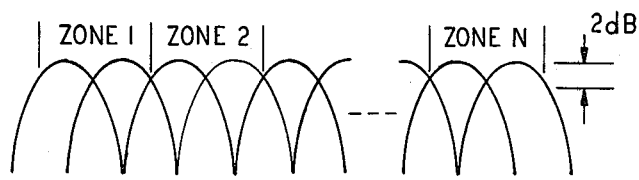
FIG. 7 illustrates a one-dimensional radiation pattern of the antenna of FIG. 6 showing two beams per strip in the far field.
Figure 8:
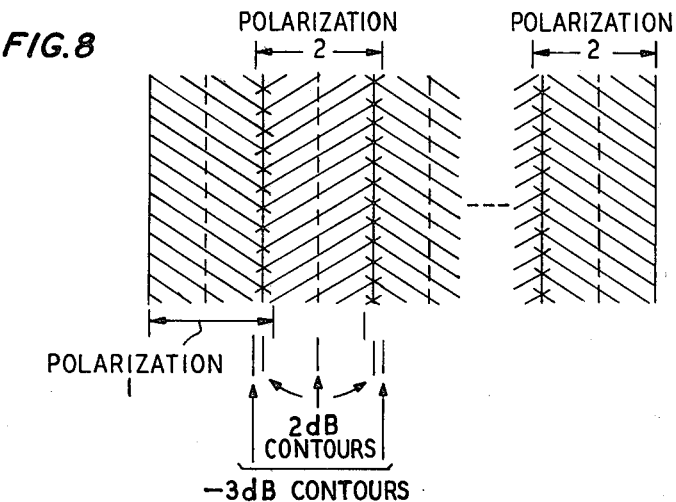
FIG. 8 is a planar field pattern of FIG. 7 showing overlap of −3 dB contours.

The utility of the antenna in FIG. 6 in achieving transponder load balancing is illustrated by the one-dimensional radiation plot of FIG. 7. Shown here are one-dimensional representations of the rectangular zones which can be provided. Each zone can support, for example, two antenna beams, but not both at the same time. For the down-link beams $14_1$–$14_N$, a two antenna beam zone can be serviced by feeding the corresponding feed elements 16 in one of two adjacent or non-adjacent rows associated with a particular zone with an input signal which is properly phased by a phase shifter 27 which phase is dependent on the feed element's 16 position in the row of the feed array. As shown in FIG. 10 for an exemplary beam selecting means 50, this phased input signal is divided in a Magic T hybrid circuit 70 with each divided input signal being applied to a separate amplifier 72 and 73, the output signals of which are combined in a magic T hybrid 74. By varying the phase with phase shifter 76 at the input to one amplifier, for example, amplifier 72 by 0 degrees or 180 degrees, the output port 77 or 78 of the hybrid 74 can be selected to receive the full power. The output ports 77 and 78 of hybrid 74 drive antenna elements 79 and 80, respectively, which in FIG. 5 can be correlated, for example, to feed elements $16_{2,1}$ and $16_{3,1}$ if the beam selecting means $50_1$ of FIG. 5 is considered for the circuit of FIG. 10. It is to be understood that the beam selecting means 50 shown in FIG. 10 is for use with two down-link beams 14. Where the circuit of FIG. 10 is to be associated with two up-link beams 10, amplifiers 72 and 73 would have to be reversed in direction and phase shifter 76 positioned at the input of amplifier 72. Additionally, where a beam selecting means 50 is associated with three or four down-link beams 14, then another circuit comprising elements 70, 72, 73, 74 and 76 as shown in FIG. 10 would be inserted at either one or both of points 82 and 83, respectively, for the capability of selecting feed element 79, 80 or either one or the other feed element associated with separate ones of the desired three or four antenna beams. The individual antenna beams of adjacent elements intersect at their −2 dB contours as shown in FIG. 8. This pattern is repeated in the orthogonal polarization.

In FIG. 8, footprints of each zone of FIG. 7 are shown laid down on a planar surface. By alternating the polarization usage within each strip, noninterfering zones can be formed as needed by the load-balancing assignment technique, and the entire frequency band can be reused within each linear zone. By contrast, if the zones are replaced by arbitrarily shaped zonal boundaries, a noninterfering condition could be assured only by subdividing the allocated spectrum and assigning subbands to zones on a noninterfering basis. Thus, the strip zones provide for a greater degree of frequency reuse.

Figure 9:
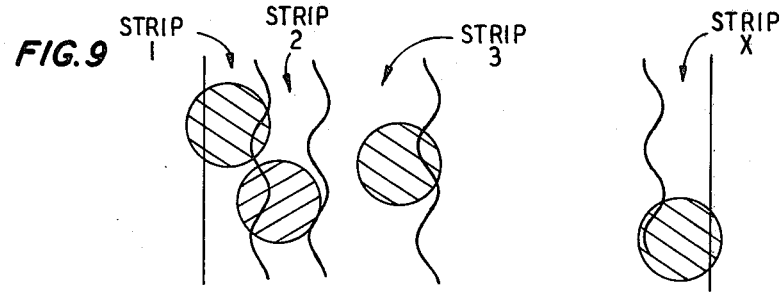
FIG. 9 is a possible set of zones showing a set of spot beam footprints.

Referring to FIG. 8, it is to be noted that additional flexibility is possible. Since each zone contains two beams, each zone can be arbitrarily split into two segments, if needed, and each segment served with opposite polarizations. The segment boundaries need not be rectangular since individual beams overlap at the −2 dB contour but are usable to the −3 dB contour. By performing such a segmentation, the width of each zone can be custom tailored using one or more adjacent of nonadjacent beams such that the resulting zones exhibit nearly identical traffic. The zones might then appear as shown in FIG. 9. Also shown in FIG. 9 are a possible set of instantaneous spot beam footprints. It is to be noted that zones are served via alternate polarization reuse, and that no two reuses can interfere by more than −20 dB. Each zone is served within the −3 dB contour of some one or more beams. Finally with this approach, an array feed and its associated transponder need not be provided in each polarization for all strips of FIG. 8 but each transponder can be associated with one or more limited scan beams.

Figure 10:
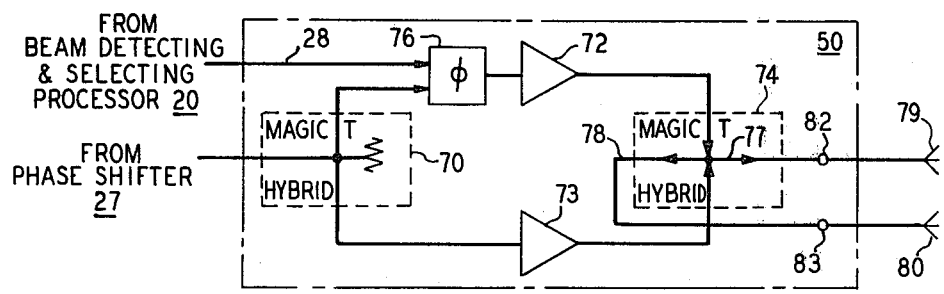
FIG. 10 is a feed element selecting circuit for a two row strip.

It is to be understood that if traffic load balancing reveals that strip 1 and strip x should comprise one receive zone R, then the feed elements $16_{1,1}$–$16_{1,p}$ and $16_{x,1}$–$16_{x,p}$ should be combined as shown in FIG. 10. For example, feed element $16_{1,1}$ and $16_{x,1}$ of FIG. 6 would be connected as shown for elements 79 and 80 of FIG. 10. The remainder of feed elements $16_{1,2}$–$16_{1,p}$ and $16_{x,2}$–$16_{x,p}$ would be similarly paired. Additionally, it is also possible to provide transmit zones $S_1$–$S_N$ or receive zones $R_1$–$R_N$ as shown in FIGS. 1 and 2 where some zones may only require one row of a feed array and others require two adjacent or non-adjacent rows of the feed array to achieve equal traffic assignment for the transponders at the satellite.

Figure 11:
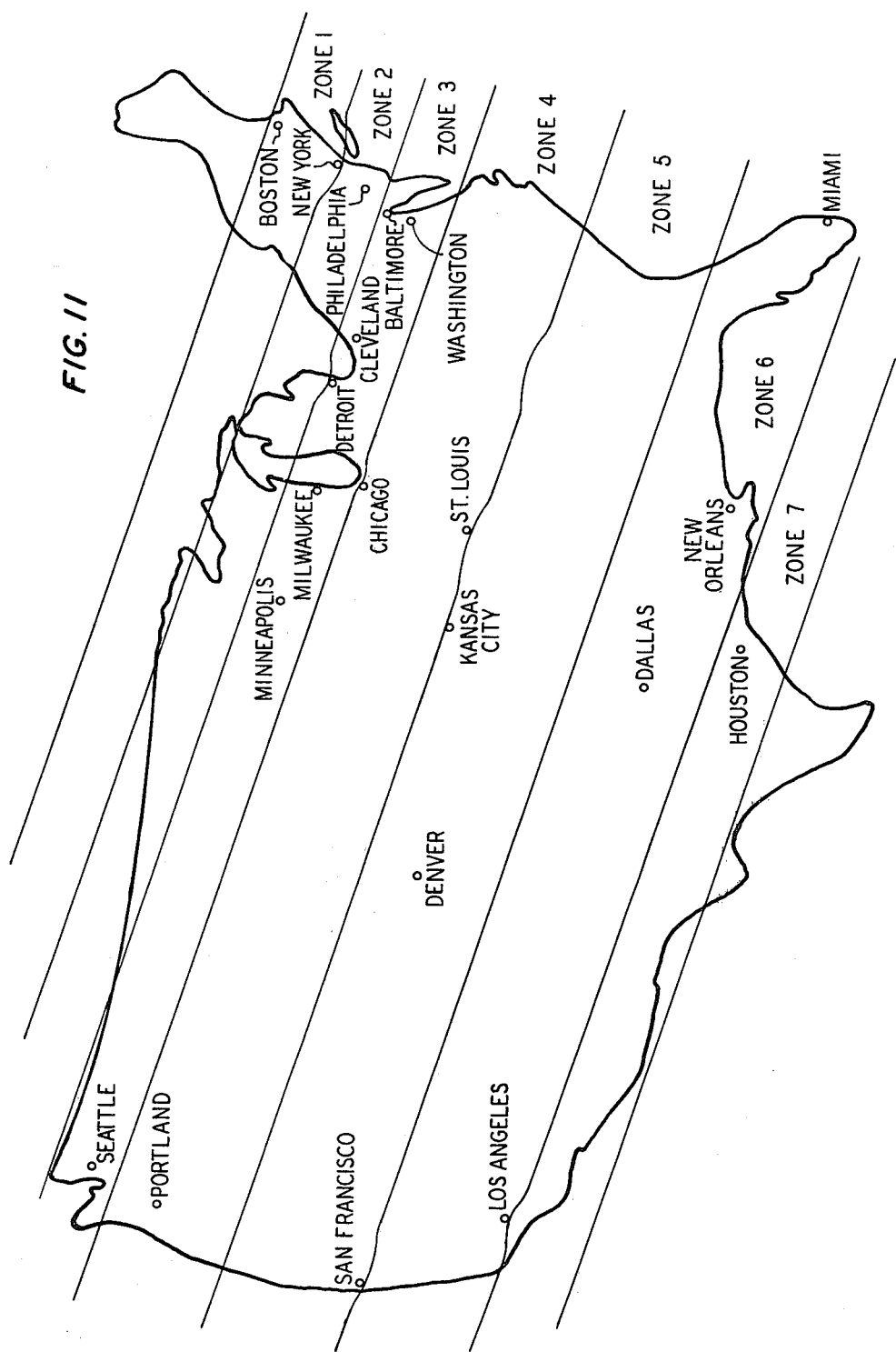
FIG. 11 illustrates an exemplary seven zone map of the United States which effects the transponder load balancing concept for a simple model of traffic according to the present invention.

To illustrate the transponder load-balancing concept, consider a simple model of the United States traffic, obtained by rank ordering the 100 largest cities in the United States, in terms of population, and permitting these cities to access the satellite network. Using this model, the relative traffic, $T_{i,j}$, presented to the satellite between pairs of cities can then be determined using, for example, the equation $$T_{i,j} \sim \frac{1}{(i)(j)}$$

where i and j are the rank order of the two cities in question. From such traffic requirements, exemplary zonal strips were determined across the United States as shown in FIG. 11. The seven zones 1–7 were created using either one or two antenna scanning strips as explained hereinbefore for FIGS. 7–10.

With the seven zones of FIG. 11, it was possible to divide the total service area into noninterfering zones, each of approximately the same traffic. The transponder efficiency of zones 1 to 7 was determined to be 100 percent, 97 percent, 100 percent, 91 percent, 85 percent, 87 percent, and 87 percent, respectively. A high degree of flexibility was achieved by orienting the strips such that zonal boundaries lie on cities of large population. Then the traffic of those large cities can be divided between two adjacent zones to best balance the transponder loads. In some cases, the zonal boundaries were slightly deformed to permit this as shown, for example, at New York and St. Louis.

In the zones with less than 100 percent transponder efficiency, dummy traffic can be assigned which can be used later as traffic growth increases. From the above-limited transponder efficiency, it can be seen that growth can be accommodated in the Southwestern portion of the United States. For example, if traffic in the Los Angeles region is increased to bring it more into line with the requirements of New York, for example, then traffic in zones 5–7 can be reassigned such that greater transponder efficiency in those zones is realized.

It is to be understood that the above-described embodiments are simply illustrative of the principles of the invention. Various other modifications and changes may be made by those skilled in the art which will embody the principles of the invention and fall within the spirit and scope thereof.

We claim:

1. In a satellite communication system, an on-board satellite switching subsystem comprising:

a plurality of x scannable receiving antenna ports ($12_1$–$12_x$), each receiving antenna port being associated with a separate one of x possible up-link beams ($10_1$–$10_N$) and only n of x beams are concurrently receivable at any instant of time, where $n \leq x$, each up-link beam being capable of propagating bursts of information in a predetermined time division multiple access (TDMA) sequence during a system frame period from a predetermined number of a plurality of m spaced-apart ground areas forming an overall system service region to the associated scannable receiving antenna port, where $n \leq m$ and different traffic demands exist between each of the pairs of the m ground areas;

a plurality of x scannable transmitting antenna ports ($16_1$–$16_x$), each transmitting antenna port being capable of forming a separate scannable down-link spot beam and the x scannable transmitting antenna ports are capable of transmitting the bursts of information concurrently received at the n of x scannable receiving antenna ports at any instant of time toward the destined ground areas in appropriate n of x concurrently transmitted down-link beams in accordance with said predetermined TDMA sequence; and switching means (34) disposed between the plurality of x scannable receiving antenna ports and the plurality of x scannable transmitting antenna ports and capable of selectively transferring the n bursts of information concurrently received at the receiving antenna ports at any instant of time to the appropriate transmitting antenna ports in accordance with said predetermined TDMA sequence for appropriate transmission in the n of x concurrently transmitted down-link beams to the destined ground areas;

characterized in that the x antenna ports of each of the plurality of scannable receiving and transmitting antenna ports are each scannable over only a separate limited portion of the plurality of m ground areas forming the overall system service region and are formed into n groups of one or more antenna ports, each group of receiving and transmitting antenna ports being associated with a separate one of the n concurrently received and transmitted beams, respectively, in a manner so that each group of receiving and transmitting antenna ports handles the traffic requirements of a separate one of n limited non-interfering transmitting communication zones ($S_1$–$S_N$) and n limited non-interfering receiving communication zones ($R_1$–$R_N$), respectively, and each of said limited non-interfering transmitting and receiving communication zones comprises a substantially equal traffic requirement.

2. An on-board satellite switching subsystem according to claim 1 wherein the switching means comprises n input and n output terminals characterized in that the subsystem further comprises:

a plurality of n transponders, where $x \leq n$, each transponder having a predetermined traffic handling capacity and comprising a receive section ($32_1$–$32_N$) interconnecting one of the n groups of receiving antenna ports and a separate input terminal of the switching means (34), and a transmit section ($36_1$–$36_N$) interconnecting a separate output terminal of the switching means and one of the n groups of transmitting antenna ports, the n transmit and receive sections being assigned to the associated group of transmitting and receiving antenna ports in a manner whereby each transponder handles approximately an equal amount of overall traffic without exceeding said predetermined traffic handling capacity.

3. An on-board satellite switching subsystem according to claim 2 characterized in that the switching subsystem further comprises:

a separate beam directing means (18,26) disposed between each of the n groups of scannable receiving and transmitting antenna ports and the associated receive and transmit sections, respectively, of each transponder, each beam directing means being capable of causing the associated group of scannable receiving and transmitting antenna ports to direct its at least one scanning spot beam path toward the appropriate ground area of the associated transmitting and receiving communication zone ($S_1$–$S_N$ and $R_1$–$R_N$), respectively, in accordance with the predetermined TDMA sequence; and a beam directing and selecting processor (20) capable of generating a sequence of control signals to each of said beam directing means for concurrently directing the scannable receiving and transmitting antenna ports to the associated ground areas in the associated transmitting and receiving communication zones, respectively, in accordance with said predetermined TDMA sequence.

4. An on-board satellite switching subsystem according to claim 3 characterized in that
the switching subsystem further comprises:
a separate beam selecting means (50) coupled to each beam directing means (18,26) associated with a group including more than one scannable receiving and transmitting antenna port for interconnecting the associated transponder section to the appropriate one of the more than one scannable receiving and transmitting antenna ports in response to control signals from the beam directing and selecting processor to effect communication with the desired ground area in the associated transmitting or receiving communication zone, respectively, in accordance with the predetermined TDMA sequence.

5. An on-board satellite switching subsystem according to claim 3
characterized in that
each of the x scannable receiving and transmitting antenna ports comprises a plurality of feed elements forming a separate phased array antenna section; and
the beam directing means associated with each group of receiving and transmitting antenna ports comprises a separate phase shifter (19,27) for each feed element in any one of the associated antenna ports which is responsive to the control signals from the beam directing and selecting processor for causing the associated scannable receiving and transmitting antenna port to effect the appropriate scanning over the associated transmitting or receiving communication zone in accordance with the predetermined TDMA sequence.

6. An on-board satellite switching subsystem according to claim 2, 3, 4, 5, or 1
characterized in that
each of the x scannable receiving and transmitting antenna ports comprises means for scanning in a linear direction only such that the associated separate limited portion of the overall service region is disposed along a strip of the overall service region which strip is separate and parallel to the other strips formed by each of the other x-1 scannable receiving or transmitting antenna ports, the x strips associated with the x scannable receiving or transmitting antenna ports covering the overall service region.

* * * * *

UNITED STATES PATENT AND TRADEMARK OFFICE
CERTIFICATE OF CORRECTION

PATENT NO. : 4,315,262
DATED : February 9, 1982
INVENTOR(S) : Anthony Acampora and Douglas O. Reudink It is certified that error appears in the above—identified patent and that said Letters Patent is hereby corrected as shown below:

In the Claims, Column 14, line 27, "$x \leq n$" should read --$x \geq n$--.

Signed and Sealed this

Twenty-third Day of November 1982

[SEAL]

Attest:

Attesting Officer

GERALD J. MOSSINGHOFF
Commissioner of Patents and Trademarks